United States Patent

Hermann et al.

(10) Patent No.: US 6,663,135 B2
(45) Date of Patent: Dec. 16, 2003

(54) TOWING HITCH FOR ARMORED VEHICLE

(75) Inventors: Manfred Hermann, Vienna (AT); Anton Strassgürtl, Schwadorf (AT); Bernhard Kumpf, Fischamend (AT)

(73) Assignee: Steyr-Daimler-Puch Spezialfahrzeug AG & Co. KG, Vienna (AT)

( * ) Notice: Subject to any disclaimer, the term of this patent is extended or adjusted under 35 U.S.C. 154(b) by 0 days.

(21) Appl. No.: 10/050,226

(22) Filed: Jan. 16, 2002

(65) Prior Publication Data

US 2002/0101057 A1 Aug. 1, 2002

(30) Foreign Application Priority Data

Jan. 26, 2001 (AT) ............................................ 61/2001 U

(51) Int. Cl.⁷ ................................................ B60D 1/48
(52) U.S. Cl. ...................................... 280/495; 280/504
(58) Field of Search ................................. 280/504, 505, 280/514, 515, 495, 500, 501, 481, 400, 480, 480.1, 491.1; 180/9.4, 9.42; 248/231.91, 231.9, 200, 300, 316.1, 903, 916; 296/188; 293/116; 224/545, 547, 556, 557, 555; 114/230.2, 230.26, 230.3; 29/444, 446

(56) References Cited

U.S. PATENT DOCUMENTS

| | | | | |
|---|---|---|---|---|
| 2,090,857 A | * | 8/1937 | White .......................... 280/501 |
| 2,444,944 A | * | 7/1948 | Minter ........................ 280/456.1 |
| 2,646,287 A | * | 7/1953 | Kytola ........................... 280/481 |
| 3,215,219 A | * | 11/1965 | Forsyth ......................... 180/14.3 |
| 3,480,296 A | * | 11/1969 | Starling ...................... 280/491.1 |
| 3,635,302 A | * | 1/1972 | Rogers et al. ................. 180/233 |
| 3,823,962 A | * | 7/1974 | Martin, Jr. .................... 280/514 |
| 5,145,199 A | * | 9/1992 | Howard ........................ 280/495 |
| 5,465,993 A | * | 11/1995 | Gee et al. ................... 280/491.5 |
| 5,624,137 A | * | 4/1997 | Lesesne ........................ 280/839 |
| 6,092,827 A | * | 7/2000 | Korpi et al. .................. 280/514 |

FOREIGN PATENT DOCUMENTS

JP          56-39907       *  4/1981

* cited by examiner

Primary Examiner—Anne Marie Boehler
(74) Attorney, Agent, or Firm—Herbert Dubno; Andrew Wilford

(57) ABSTRACT

An front wall of an armored vehicle is formed with a large-diameter hole and has a tow hitch in turn having a generally cup-shaped reinforcement plate having an outer periphery engaging an inner face of the front wall around the hole. This plate is forwardly concave toward the hole and the outer periphery is welded to the inner face of the wall by a weld. A tow-eye bar fixed to the center of the reinforcement plate extends forward through the hole. The hole and plate are circular and the plate is of greater diameter than the hole.

6 Claims, 3 Drawing Sheets

TOWING HITCH FOR ARMORED VEHICLE

FIELD OF THE INVENTION

The present invention relates to a towing hitch for an armored vehicle. More particularly this invention concerns a tow eye for an armored trailer.

BACKGROUND OF THE INVENTION

It is standard to provide an armored vehicle, in particular a trailer, with a hitch, normally an eye, by means of which it can be towed. Standard design principles require that the hitch be strong enough to carry 1.5 times the overall weight of the vehicle.

With a heavily armored trailer this is not a problem, as the eye can simply be welded to the front plating which is strong enough to meet the design criteria. On more lightly armored vehicles, however, it is necessary to reinforce around the towing hitch. This is typically done by welding on a plate, stiffening ribs, or the like. Such reinforcement adds unnecessarily to the weight of the vehicle and in fact often presents a location at which, in spite of the additional structure, the actual ballistic resistance and armor rating is reduced.

OBJECTS OF THE INVENTION

It is therefore an object of the present invention to provide an improved towing hitch for a vehicle.

Another object is the provision of an improved towing eye for an armored vehicle which overcomes the above-given disadvantages, that is which has the desired pull rating without increasing the weight of the vehicle or reducing its resistance to penetration.

SUMMARY OF THE INVENTION

An armored vehicle according to the invention has a front wall provided with a tow hitch having a generally cup-shaped reinforcement plate having an outer periphery fixed to a face of the front wall and a center and a tow eye fixed to the center of the reinforcement plate. The system according to the invention has the advantage that the tow hitch is substantially simplified. The number of shield parts is substantially decreased while the cup shape of the reinforcement provides a better ballistic protection than a narrow or pointed part as produced with normal reinforcing ribs. In addition conduits, cables, and the like mounted on the surface can pass by the hitch without having to be deflected over bulky reinforcement structure. Of course this arrangement is also much lighter than the prior-art reinforcements.

The plate in accordance with the invention is forwardly concave. The wall itself is formed with a hole covered by the plate and the outer periphery is fixed to the wall around the hole with the eye extending through the hole. Thus the tension applied to the eye is transmitted to the wall over a relatively wide area, insuring that the eye will not be pulled out or the wall deformed.

In a further system according to the invention the eye extends through and is fixed to the wall. It is also possible to provide at least one reinforcement gusset fixed to the eye and to the wall.

According to the invention the hole and plate are circular and the plate is of greater diameter than the hole. Furthermore the plate can have an annular part-spherical portion and an inner frustoconical portion. In another system a pair of gussets flank the eye and welds secure the gussets to the eye and to the plate.

BRIEF DESCRIPTION OF THE DRAWING

The above and other objects, features, and advantages will become more readily apparent from the following description, reference being made to the accompanying drawing in which:

FIGS. 3, 4, and 5 are views like respective FIGS. 1, 2, and 3 of another hitch in accordance with the invention.

SPECIFIC DESCRIPTION

Figure 3:
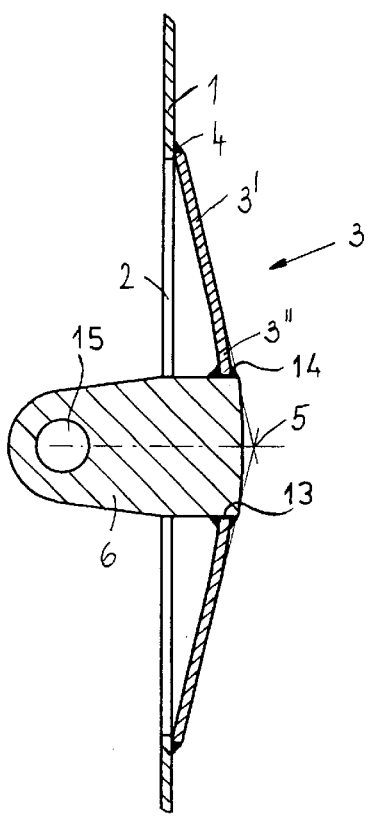
FIG. 3 is a larger-scale section through the hitch of FIGS. 1 and 2.
Figure 1:
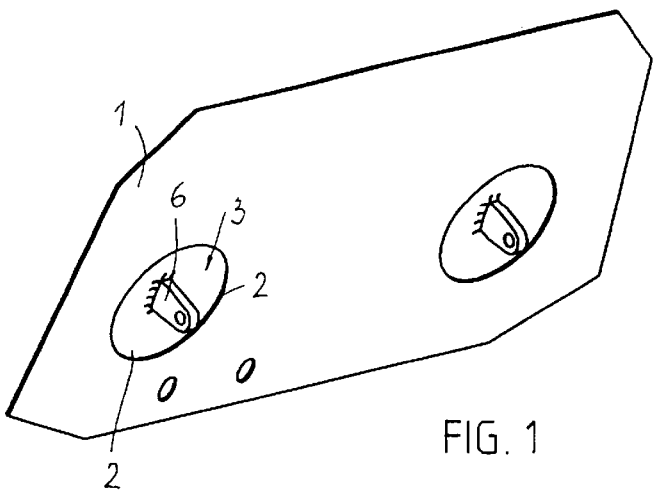
FIG. 1 is a small-scale front perspective view of a double towing hitch according to the invention.
Figure 2:
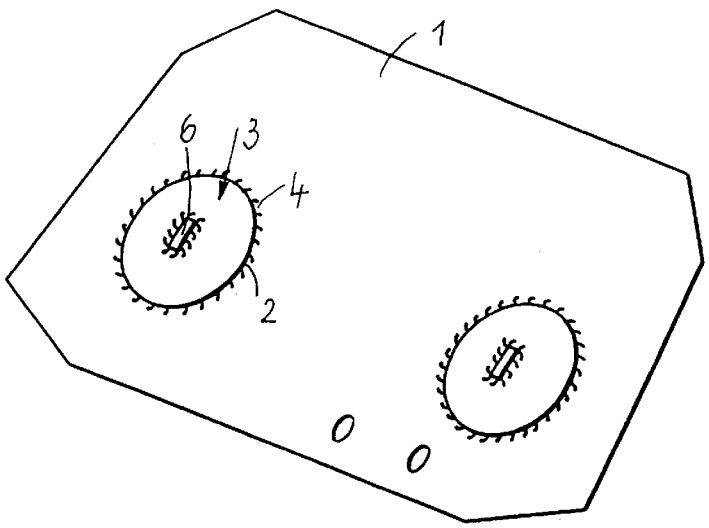
FIG. 2 is a small-scale rear perspective view of the hitch of FIG. 1.

As seen in FIGS. 1 through 3 an armored-vehicle front wall 1 is formed with a pair of large-diameter circular holes or apertures 2. Domed or cup-shaped plates 3 have outer diameters slightly greater than those of the holes 2 and are secured around the respective holes 2 at circular welds 4 to the inside face of the wall 1. These plates 3 each have a part-spherical outer region 3' and a frustoconical inner region 3", the latter having an apex point 5 lying somewhat inward or rearward of the plate 3. A flat bar-like tow eye 6 fits snugly in a rectangular hole 13 in each of the plates 3 and is secured thereto inside and outside by welds 14. These tows eye 6 thus project horizontally forward through the centers of the holes 2 and their tow holes 15 lie wholly ahead of the armored wall 1.

Figure 6:
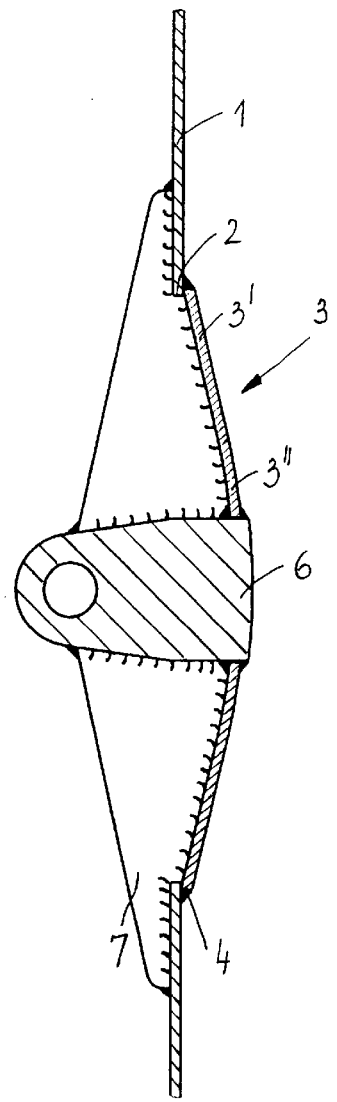
FIGS. 6, 7, and 8 are views like respective FIGS. 1, 2, and 3 of yet another hitch according to the invention.
Figure 5:
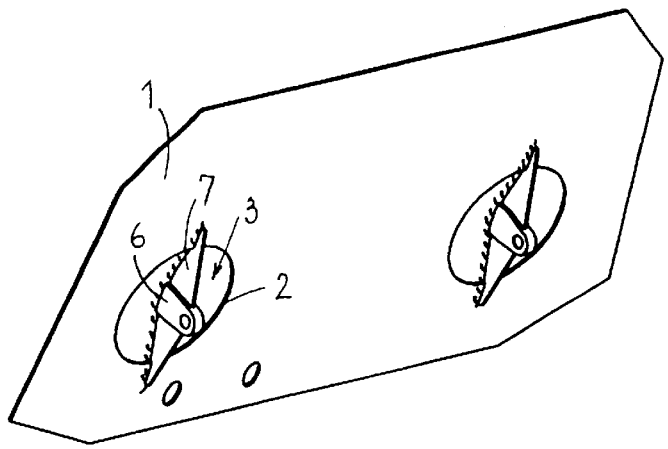
Figure 4:
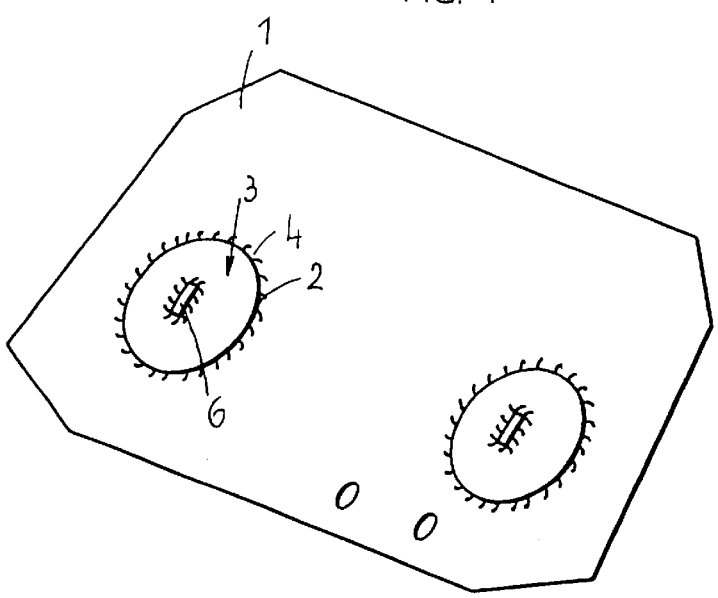

The arrangement of FIGS. 4 through 6, where the same reference numerals as in FIGS. 1 through 3 are used for functionally or structurally identical parts, has a pair of reinforcing plates or gussets 7 lying in the same vertical plane as each of the tow eyes 6. These gussets 7 are welded to the front face of the wall 1, the front face of the respective plate 3, and the edge of the respective tow eye 6.

Figure 7:
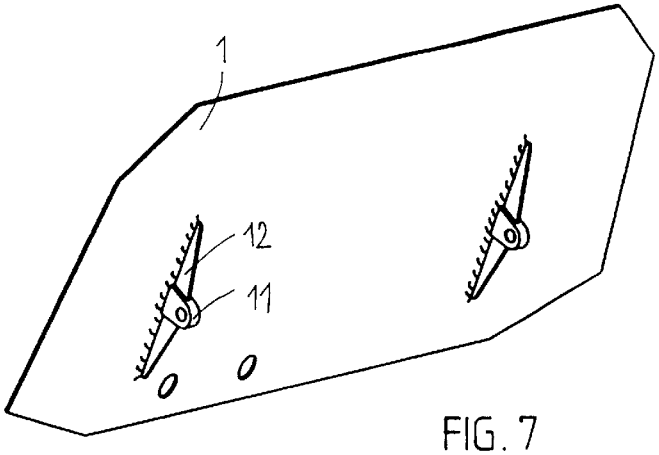
Figure 8:
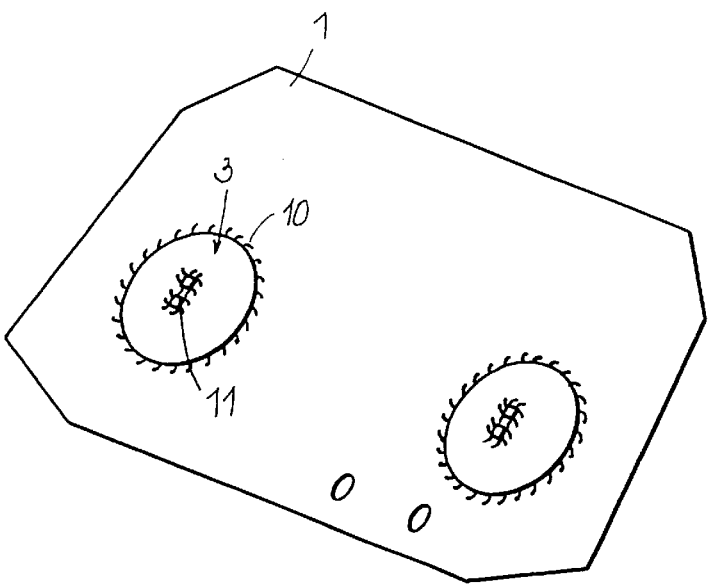
Figure 9:
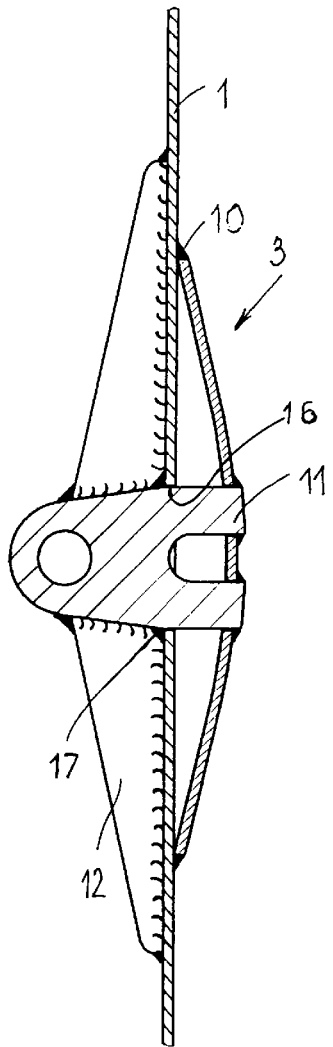

In the arrangement of FIGS. 7 through 9, where once again the same reference numerals as in FIGS. 1 through 3 are used for functionally or structurally identical parts, there are no large-diameter circular holes 6 in the front wall 1. Instead it has rectangular apertures 16 through which the tow eyes 6 pass snugly and around which they are secured by welds 17. The outer edges of the reinforcing plates 3 are secured at welds 10 to the inner face of the wall 1 and the eyes 6 each have a forked rear end 11 fitted through and welded to the respective plate 3. In addition two gusset plates 12 like the plates 7 are welded to each of the eyes 6 and to the front face of the wall 1.

We claim:

1. In an armored vehicle having a front wall, a tow hitch comprising:

a generally cup-shaped and forwardly concave reinforcement plate having an outer periphery fixed to a face of the front wall and a center; and a tow eye fixed to the center of the reinforcement plate, extending through the wall, and being fixed to the wall.

2. The armored-vehicle tow hitch defined in claim 1 wherein the wall is formed with a hole covered by the plate, the outer periphery being fixed to he wall around the hole and the eye extending through the hole.

3. In an armored vehicle having a front wall, a tow hitch comprising:

a generally cup-shaped and forwardly concave reinforcement plate having an outer periphery fixed to a face of the front wall and a center;

a tow eye fixed to the center of the reinforcement plate; and at least one reinforcement gusset fixed to the eye and to the wall.

4. In an armored vehicle having a front wall formed with a large-diameter hole, a tow hitch comprising:
- a generally cup-shaped reinforcement plate having an outer periphery engaging an inner face of the front wall around the hole and a center, the plate being forwardly concave toward the hole and having an annular part-spherical portion and an inner frustoconical portion;
- a weld fixing the outer periphery to the inner face; and
- a tow-eye bar fixed to the center of the reinforcement plate and extending forward through the hole.

5. The armored-vehicle tow hitch defined in claim 4 wherein the hole and plate are circular, the plate being of greater diameter than the hole.

6. In an armored vehicle having a front wall formed with a large-diameter hole, a tow hitch comprising:
- a generally cup-shaped reinforcement plate having an outer periphery engaging an inner face of the front wall around the hole and a center, the plate being forwardly concave toward the hole;
- a weld fixing the outer periphery to the inner face;
- a tow-eye bar fixed to the center of the reinforcement plate and extending forward through the hole;
- a pair of gussets flanking the eye; and;
- welds securing the gussets to the eye and to the plate.

* * * * *